United States Patent
Mori

(10) Patent No.: US 7,324,223 B1
(45) Date of Patent: Jan. 29, 2008

(54) NETWORK FACSIMILE DEVICE AND A METHOD OF CONTROLLING THE NETWORK FACSIMILE DEVICE

(75) Inventor: Yukikazu Mori, Ebina (JP)

(73) Assignee: Ricoh Company, Ltd., Toyko (JP)

( * ) Notice: Subject to any disclaimer, the term of this patent is extended or adjusted under 35 U.S.C. 154(b) by 0 days.

(21) Appl. No.: 09/459,202

(22) Filed: Dec. 10, 1999

(30) Foreign Application Priority Data

Dec. 11, 1998 (JP) .................................. 10-352679

(51) Int. Cl.
G06F 15/00 (2006.01)
H04N 1/00 (2006.01)

(52) U.S. Cl. .................... 358/1.15; 358/1.13; 358/440; 358/442

(58) Field of Classification Search ............... 358/1.15, 358/440, 1.13, 400, 402, 442; 379/100.01, 379/100.17
See application file for complete search history.

(56) References Cited

U.S. PATENT DOCUMENTS

| | | | | |
|---|---|---|---|---|
| 4,920,560 A | * | 4/1990 | Kageyama ............. | 379/100.14 |
| 5,381,527 A | * | 1/1995 | Inniss et al. ................. | 709/239 |
| 6,052,445 A | * | 4/2000 | Bashoura et al. ...... | 379/100.14 |
| 6,437,871 B1 | * | 8/2002 | Yuki ......................... | 358/1.15 |

FOREIGN PATENT DOCUMENTS

JP  10-243019  9/1998

* cited by examiner

Primary Examiner—Thomas D. Lee
(74) Attorney, Agent, or Firm—Cooper & Dunham, LLP

(57) ABSTRACT

The invention relates to a network facsimile device for communicating in at least one of a plurality communication modes for transmitting designated image information to a designated destination. The device comprises input means for inputting information identifying a plurality of addresses and for designating one address among said plurality addresses and address information registering means for registering a plurality of address information respectively corresponding to the plurality of communication modes, for each designated destination.

34 Claims, 9 Drawing Sheets

FIG. 4A

| ONE-TOUCH DIAL INFORMATION #1 |
|---|
| ONE-TOUCH DIAL INFORMATION #2 |
| ONE-TOUCH DIAL INFORMATION #3 |
| ... |
| ONE-TOUCH DIAL INFORMATION #n |

FIG. 4B

| ABBREVIATED DIAL INFORMATION #1 |
|---|
| ABBREVIATED DIAL INFORMATION #2 |
| ABBREVIATED DIAL INFORMATION #3 |
| ... |
| ABBREVIATED DIAL INFORMATION #99 |

FIG. 4C

| TELEPHONE NUMBER |
|---|
| MAIL ADDRESS |
| IP ADDRESS |

FIG. 4D

[ TELEPHONE NUMBER ] [ * * ] [ PRIORITY ]
[ MAIL ADDRESS ] [ * * ] [ PRIORITY ]
[ IP ADDRESS ] [ * * ] [ PRIORITY ]

```
TRANSMISSION MODE ;
  FAX
ADDRESS ;
  03 1234 5678
```

FIG. 8B

```
TRANSMISSION MODE ;
  REAL-TIME
ADDRESS ;
  133.139.22.33
```

FIG. 8C

```
TRANSMISSION MODE ;
  INTERNET MAIL
ADDRESS ;
    USER1@abc.co.jp
```

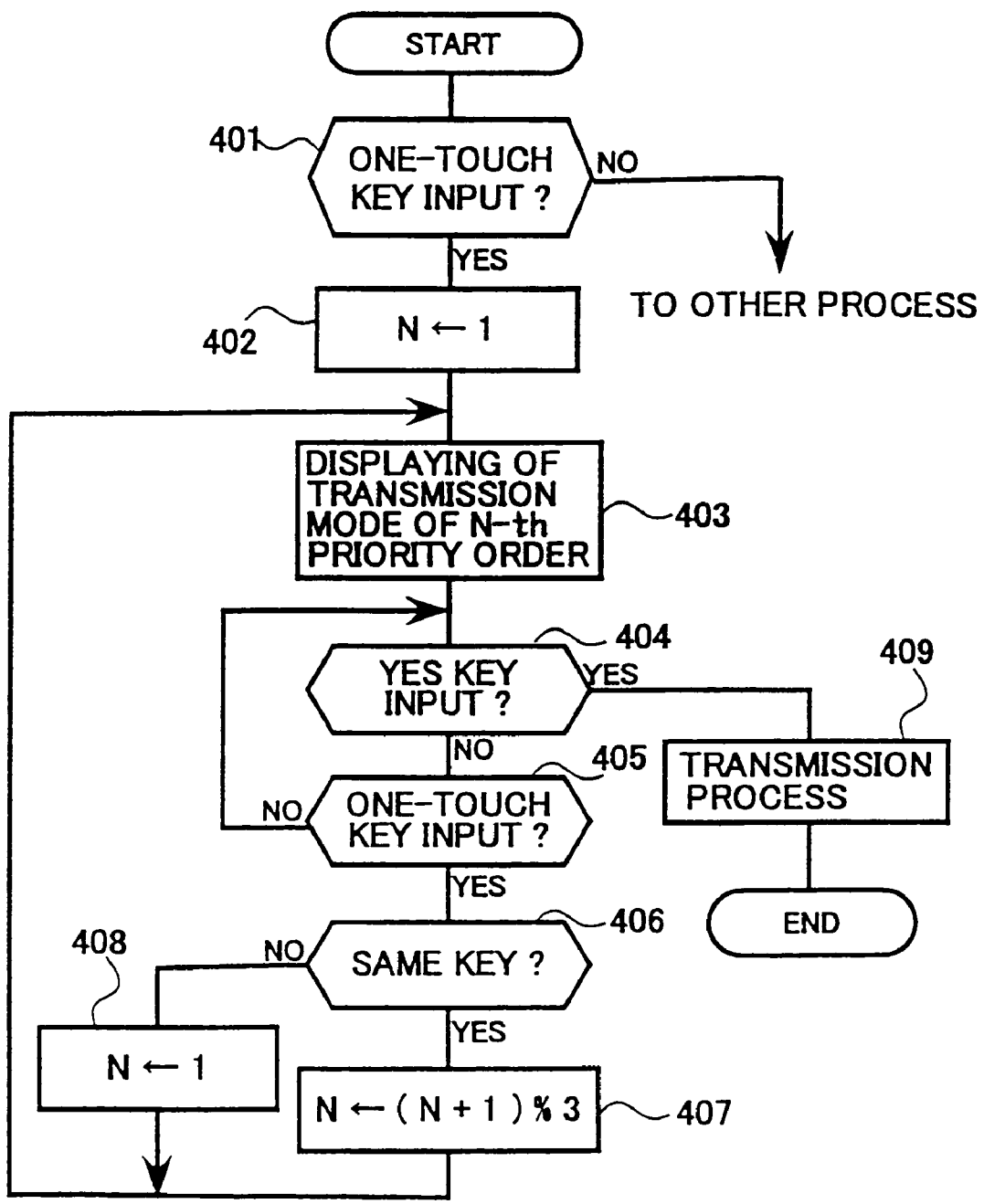

NETWORK FACSIMILE DEVICE AND A METHOD OF CONTROLLING THE NETWORK FACSIMILE DEVICE

BACKGROUND OF THE INVENTION

1. Field of the Invention

The present invention relates to a network facsimile device provided with plural communicating media and capable of selecting either one of the plural communicating media for transmitting designated information to a designated address.

2. Discussion of the Background

In recent years, the utilization of the Internet has been considered as the communication circuit for a facsimile device. As the communication standard therefor, two recommendations; ITU-T Recommendation T.37 and ITU-T Recommendation T.38 have been established.

In the ITU-T Recommendation T.37, an electronic-mail type Internet facsimile communicating method has been prescribed. In the method, the image information is communicated through the Internet by use of an electronic mail. On the other hand, in the ITU-T Recommendation T.38 based upon the Group-3 Facsimile Transmission Procedure through Internet (Procedure of ITU-T Recommendation T.30), a real-time type Internet facsimile communicating method has been prescribed. In the method, the image information is communicated in real time.

In such situation, under the establishment of the recommendation T.38, a network facsimile device which is provided with a function of communicating the image information through the public network, and in addition, a function of electronic-mail type Internet facsimile communication or real-time type Internet facsimile communication and which can perform the image information communication through the public network and the Internet has been practically used.

On the other hand, even in the technical field of the Internet, the trial of performing the facsimile communication has been practically executed by use of the Internet before the era of the ITU-T Recommendations T.37 and T.38.

For instance, the document RFC (Request For Comments) 2301-2306 published by the organization responsible for technologies in relation to the Internet and called IETF (Internet Engineering Task Force) prescribes the technical contents of an electronic-mail type Internet facsimile communication system for communicating facsimile image information by utilizing the electronic mail which is exchanged on the Internet.

Furthermore, in the recommendation T.37 and RFC2305 (simple-mode facsimile), the model of the used electronic mail is made common, the facsimile information can be mutually exchanged between the network facsimile device in accordance with the recommendation T.37 and a work station actually provided with the software based on RFC2305.

In such situation as mentioned heretofore, in the network facsimile device, it has been possible to select either a Group-3 facsimile communication utilizing the public network as the communicating system, an electronic-mail type Internet facsimile communication utilizing the electronic mail of the Internet, and a real-time type Internet facsimile communication.

On the other hand, the address information for designating the address to be communicated differs, respectively, in the Group-3 facsimile communication, the electronic-mail type Internet facsimile communication, and the real-time type Internet facsimile communication.

For instance, the telephone number on the public network is used as the address information in the Group-3 facsimile communication, an e-mail address is used as the address information in the electronic-mail type Internet facsimile communication, and the IP address is used as the address information in the real-time type Internet facsimile communication.

Therefore, in the network facsimile device as mentioned above, it is necessary to register one to three different types of address information for each address to be communicated to. If individual keys are provided for designating the address information, problems likely occur since the number of operation keys of the network facsimile device increases and that results in a cost increase of the apparatus, or the operations for designating the addresses to be communicated to becomes further complicated.

SUMMARY OF THE INVENTION

The present invention has been made in view of the above-mentioned problems and other problems in order to solve these undesirable problems.

To state in more detail, the present invention solves the background-art defects such as the above-mentioned problems. The present invention provides a network facsimile device connected to an Internet or a local area network employing an electronic mail system capable of solving the background-art defects and thereby realizing an improved network facsimile device. The present invention provides a method of controlling the above-mentioned network facsimile device. The present invention provides a network facsimile device capable of reducing the number of the keys for selecting the dial information of the address to be communicated to and reducing the complicated and troublesome labor of the operation of the time of the address to be communicated.

Other objects, features and advantages of the present invention will become apparent from the following detailed description when read in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A through 4E are outlined views respectively showing examples of a one-touch dial table, a shortening dial table, and an address information, etc.;

FIGS. 8A through 8C are outlined views respectively showing the examples of selecting the address information and the transmission mode at the time of repeatedly operating the one-touch key "A"; and FIG. 9 is a flowchart illustrating an example of the processing executed by the system control section at the time of operating the one-touch dial key "A".

DETAILED DESCRIPTION OF THE PREFERRED EMBODIMENT

Figure 1:
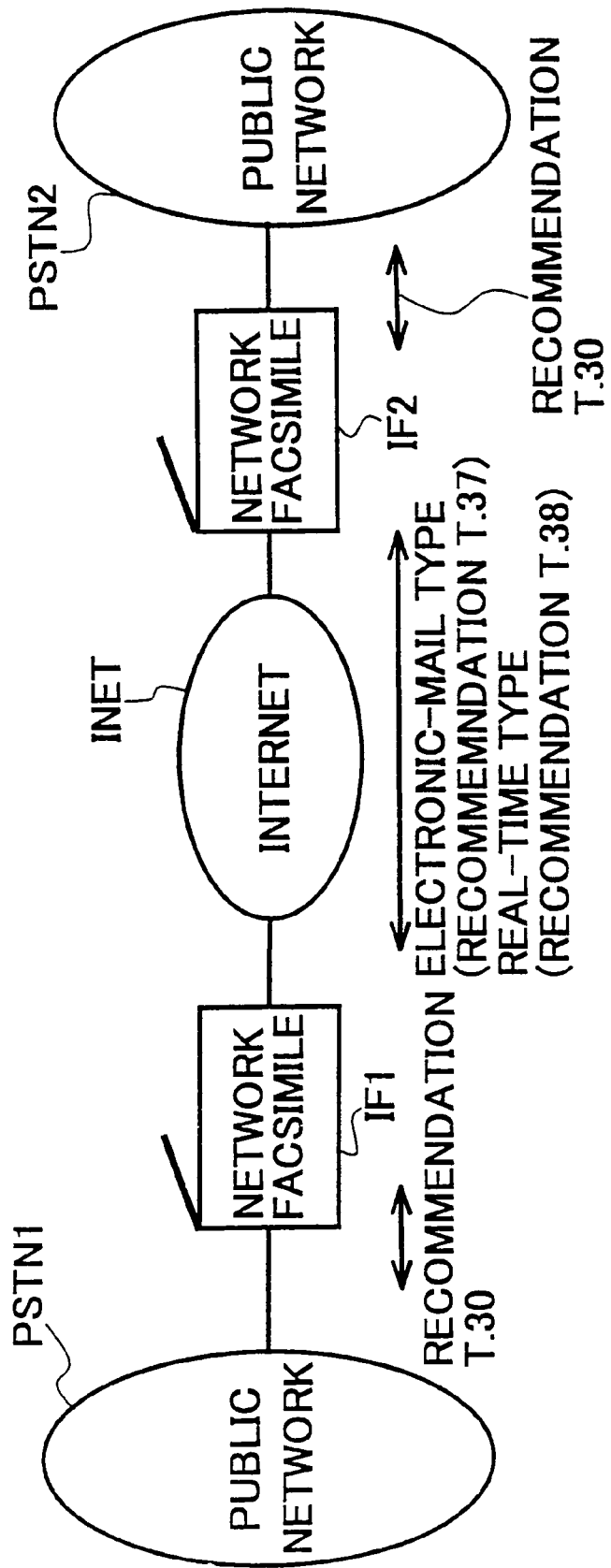
FIG. 1 is a block diagram illustrating the outline of a facsimile communication system according to and embodiment of the present invention.

In describing preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Embodiments of the present invention are described hereinafter, referring to the accompanying drawings in which FIG. 1 illustrates the outline of a facsimile communication system according to an embodiment of the present invention.

In such a communication system, the network facsimile device IF1 is connected to the public network PSTN 1 and the Internet INET. The network facsimile device IF1 is provided with a Group-3 facsimile communicating function based on the ITU Recommendation T.30 for communicating image information through the public network PSTN 1, an electronic-mail type Internet facsimile communicating function based on the ITU-T Recommendation T.37 for communicating the image information through the Internet INET, and a real-time type Internet facsimile communicating function based on the ITU-T Recommendation T.38 also for communicating through the Internet INET.

Furthermore, the system may also include a network facsimile device IF2 connected to the public network PSTN2 and the Internet INET. The network facsimile device IF2 is provided with a Group-3 facsimile communicating function based on the ITU Recommendation T.30 for communicating the image information through the public network PSTN2, an electronic-mail type Internet facsimile communicating function based on the ITU-T Recommendation T.37 for communicating the image information through the Internet INET, and a real-time type Internet facsimile communicating function based on the ITU-T Recommendation T.38 also for communicating through the Internet INET.

Moreover, the ITU-T Recommendation T.38 further prescribes a real-time Internet gateway function capable of utilizing the network facsimile device as a relaying device in the Internet INET at a time when the Group-3 facsimile device connected to the public network PSTN communicates image information through the Internet INET by use of the communication protocol of the ordinary recommendation T.30. Therefore, it may also be possible to provide such real-time Internet gateway function in the above-mentioned network facsimile devices IF1 and IF2.

Hereupon, the details of the recommendations T.37 and T.38 and the RFC2301-2305 are omitted, since there are many parts thereof not directly related to the present invention.

Figure 2:
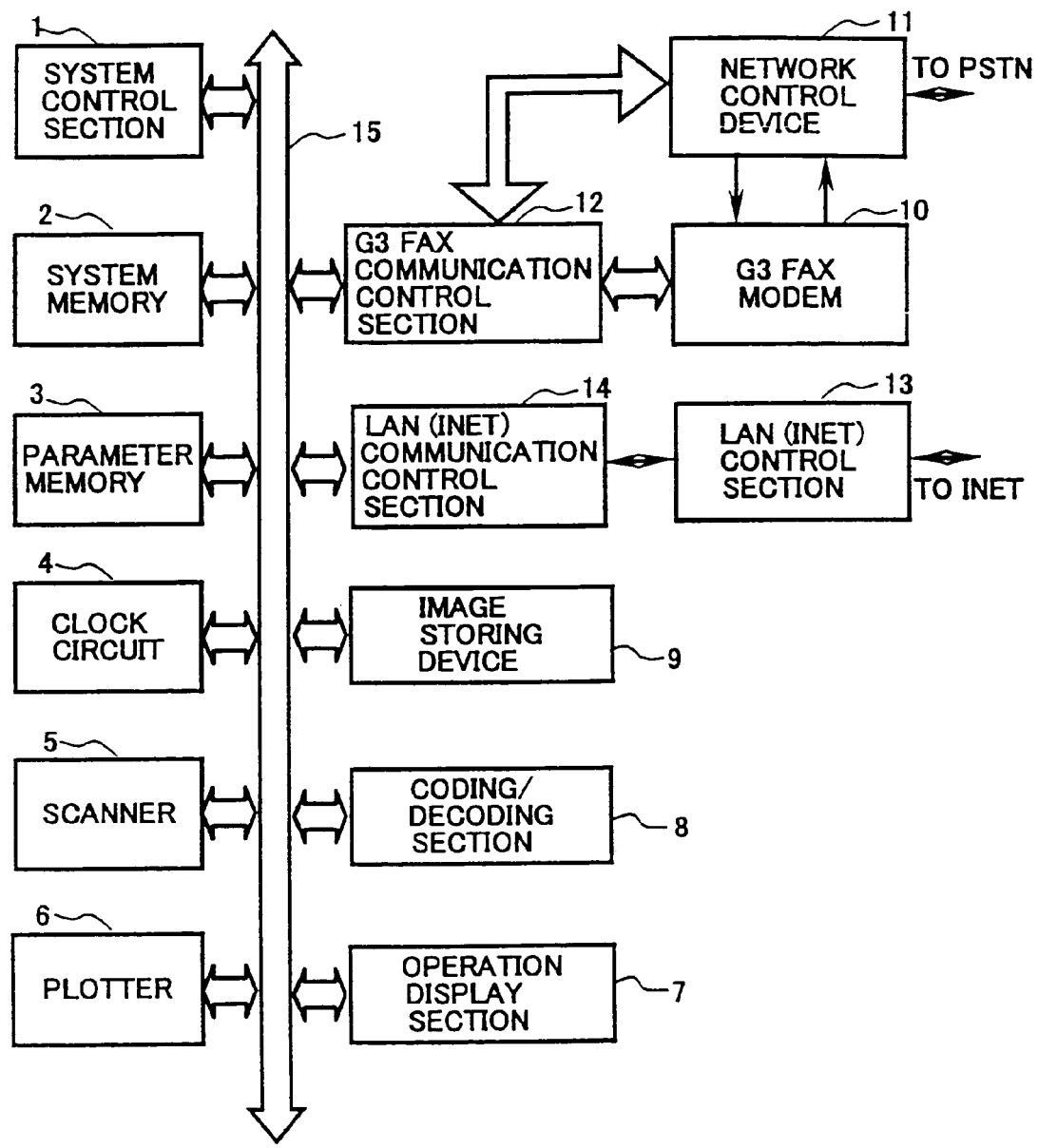
FIG. 2 is a block diagram illustrating the structural example of a network facsimile device IF (IF1, IF2) according to an embodiment of the present invention.

FIG. 2 illustrates the structural example of a network facsimile device IF(IF1,IF2) according to an embodiment of the present invention. In FIG. 2, a system control section 1 performs various sorts of control processings such as the control processing for the respective parts of the network facsimile device IF, and the control processing for the overall operation of the device, etc. A system memory 2 stores the control processing program executed by the system control section 1, and various sorts of data required at the time of executing the processing program, etc., and includes a work area for the system control section 1. A parameter memory 3 stores the various sorts of the information inherent to the network facsimile device IF. A clock circuit 4 outputs the information of the present time.

A scanner 5 reads the image of an original manuscript document with a predetermined resolution. A plotter 6 records and outputs the image with the predetermined resolution. An operation display section 7 operates the network facsimile device IF, and is composed of various sorts of operation keys and various sorts of displaying units.

A coding/decoding section 8 performs the operations of coding/compressing the image signal and decoding the coded and compressed image information to the initial image signal. An image storing device 9 stores a large amount of image information which has been coded and compressed.

A Group-3 facsimile MODEM 10 realizes the MODEM function of the Group-3 facsimile, and the MODEM 10 is provided with a low-speed MODEM function (V.21 MODEM) for exchanging the transmission procedure signals and a high-speed MODEM function (V.17 MODEM, V.34 MODEM, V.29 MODEM, V.27ter MODEM, etc.) for mainly exchanging the image information.

A network control device 11 connects the network facsimile device IF to the public network PSTN (PSTN 1, PSTN 2). The device 11 is provided with an automatic function for transmitting and receiving signals. A group-3 facsimile communication control section 12 executes the protocol processing based on the recommendation T.30 and realizes the predetermined Group-3 facsimile communication.

A local area network (Internet) control section 13 connects the network facsimile device IF to the Internet INET through the local area network not shown in FIG. 2. A local area network (Internet) communication control section 14 realizes an electronic-mail type Internet facsimile communicating function based on the recommendation T.37 and a real-time type Internet facsimile communicating function, and thereby the section 14 performs the operation of exchanging image information.

The above-mentioned respective units; the system control section 1, the system memory 2, the parameter memory 3, the clock circuit 4, the scanner 5, the plotter 6, the operation display section 7, the coding/decoding section 8, the image storing section 9, the Group-3 facsimile communication control section 12, and the local area network (Internet) communication control section 14 are connected, all together, to an internal bus 5. The operation of exchanging data between those respective elements is performed, mainly, through the internal bus 15.

Moreover, although an explanation is omitted here for the sake of simplification, the network facsimile device IF is generally connected to a local area network. The local area network can be connected to the Internet via an Internet service provider through a router apparatus, etc.

Thereby, the local area network may be considered as one element forming the Internet INET. Consequently, the respective devices (including the network facsimile device IF) connected to the local area network can perform adequate data communication through the local area network and the Internet INET.

Figure 3:
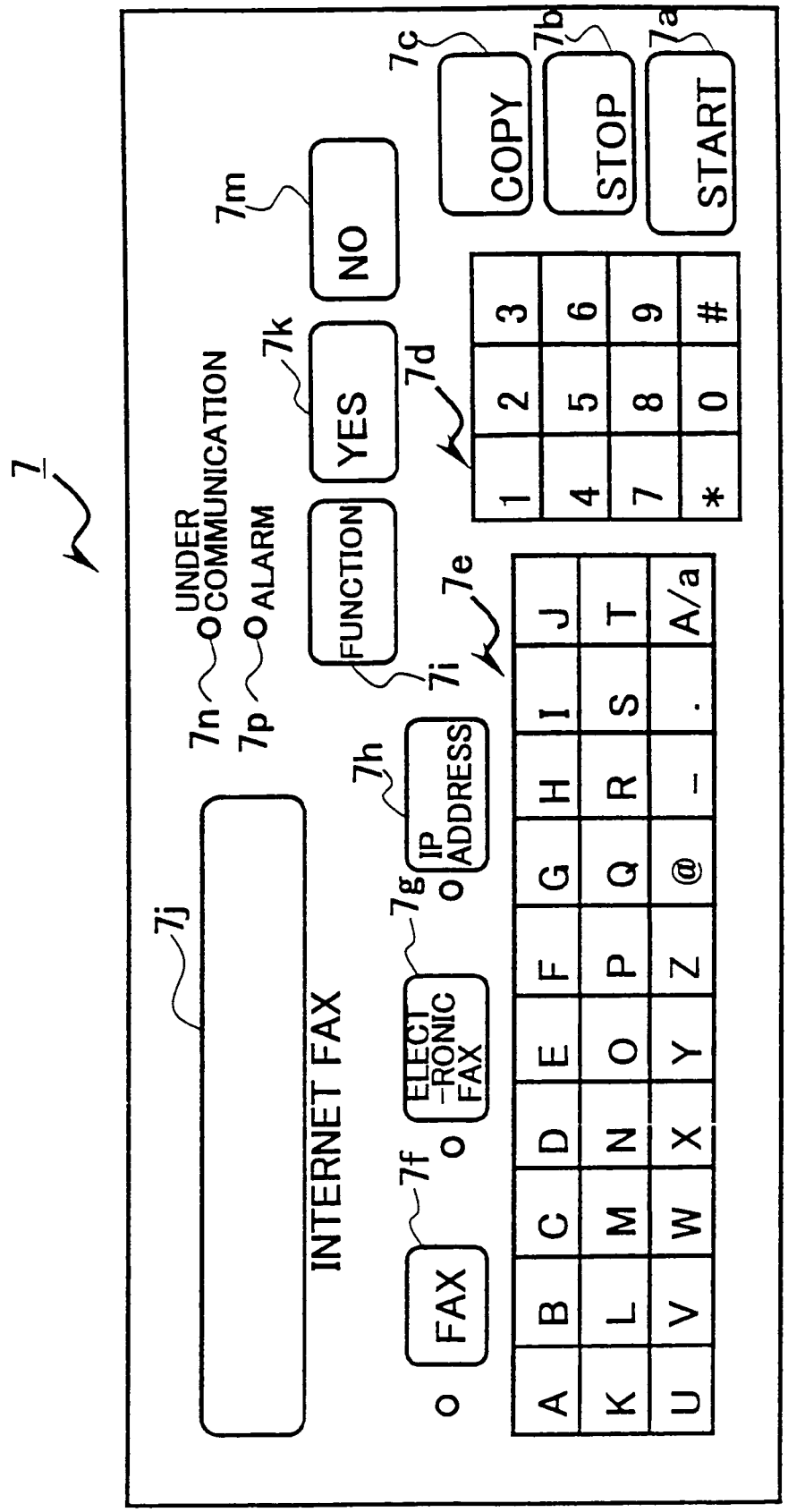
FIG. 3 is an outlined view illustrating an example of an operation display section.

FIG. 3 illustrates an example of the operation display section 7. In FIG. 3, a start key 7a inputs a command for starting the transmitting/receiving operation of the network facsimile device IF, and a stop key 7b inputs a command for stopping the operation of the network facsimile device IF. A copy key 7c starts a copying operation of the network facsimile device IF. A ten key key-pad 7d inputs the numeral (numerical value) information such as telephone numbers, etc.

A group of keys 7e are used, as either mail keys serving as keys for inputting a letter of the alphabet or a symbol for inputting the mail address, or as a one-touch dial key for designating the address to be communicated by a one-touch key dial operation.

A FAX key 7f designates the facsimile mode for registering a telephone number. An electronic-mail fax key 7g designates the electronic-mail mode for registering the e-mail address. An IP Address key 7h designates the IP address mode for registering the IP address.

A function key 7i designates various sorts of functions for the network facsimile device IF such as the registration of address information corresponding to a one-touch dial key. A liquid crystal display (LCD) unit 7j displays various sorts of messages delivered to the operator from the network facsimile device IF. A YES key 7k is employed for inputting a positive answer to guidance messages displayed on unit 7j. A NO key 7m is employed for inputting negative answers thereto.

A lamp 7n displays the fact that the network facsimile device IF is performing a communicating operation. A lamp 7p displays an alarm that an error (abnormal operation) has occurred in the network facsimile device IF.

The information referred to at the time of designating the address to be communicated by use of the one-touch dial function is registered into a one-touch dial information table as shown in FIG. 4A, in the network facsimile device IF.

Furthermore, the network facsimile device IF is provided with a shortening dial function capable of selecting the address to be communicated by designating a two-figured number, and the contents to be registered in the respective shortening dials are registered into a abbreviated dial information table as shown in FIG. 4B.

Furthermore, three sorts of address information; telephone number, mail address, and IP address, are registered per address to be communicated to, into one-touch dial information forming the one-touch dial information table, and into the abbreviated dial information forming the shortening dial information table, as shown in FIG. 4C.

The telephone number, mail address, and IP address are preserved in the format styles of "Telephone Number" "" "Priority", "Mail Address" "" "Priority", "IP Address" "**" "Priority", as shown in FIG. 4D.

Here, the "Telephone Number", the "Mail Address", and the "IP Address", include necessary information, respectively, for performing the respective communications. The "**" is a punctuation symbol (code) used for setting off the former-half "Telephone Number", etc. and the latter-half "Priority", etc.

The "Priority" is composed of a two-figured number "ba". The first-figure number "a" takes one of the values 1~9. Here, the smaller the number, the higher the priority. Regarding the second-figure number "b", a "1" or another number is arranged in the "b" slot. The number "1" signifies that, even through a communication error has occurred in the transmission mode of higher priority, for example, the mode of communication (e.g., telephone number, mail address, IP address) corresponding to the priority having a "1" in the "b" slot will be inhibited as will be discussed later. That is, if an error occurs, a communication attempt will not be made in this mode. Numbers other than "1" in the "b" slot are meaningless values.

Furthermore, since the terminals of the respective addresses to be communicated are not always provided with the same functions as that of the network facsimile device IF, all of the address information; the telephone number, mail address and IP address are not always registered into all of the one-touch dial information or the abbreviated dial information.

Namely, the network facsimile device IF can exchange image information between an ordinary Group-3 facsimile device and the device IF itself through the public network PSTN. On that occasion, when the Group-3 facsimile device is registered as the address to be communicated, only the telephone number is registered.

On some occasions, the network facsimile device IF may be provided only with an electronic-mail type Internet facsimile communicating function, or a real-time type Internet facsimile communicating function. In this case, a telephone number and a mail address or only the mail address, or the telephone number and the IP address or only the IP address are (is) registered.

The merits and demerits are respectively described, for the Group-3 facsimile communication utilizing the public network PSTN, the electronic-mail type Internet facsimile communication, and the real-time type Internet facsimile communication.

Regarding the Group-3 facsimile communication, since the facsimile device IF is directly connected to the terminal of the communication partner, the image information communication can be practiced utilizing all of the terminal functions of the communication partner's terminal, and in addition the result of delivering the image information can be obtained instantly. These are the merits of the Group-3 facsimile communication. On the other hand, such communication has demerits, that, when the terminal of the communication partner is busy, the communication cannot be performed, and that the communication cost is increased at the time of long-distance communication.

Regarding the electronic-mail type Internet facsimile communication, since the Internet is utilized as the communication circuit, the communication cost can be lowered at the time of long-distance communication, and in addition, even through the communication partner's terminal is busy, the image information can be transmitted because of the utilization of electronic mail. These are the merits of the electronic-mail type Internet facsimile communication. On the other hand, such communication has demerits, that, since such Internet facsimile device is not directly connected to the communication partner's terminal, the mode of the image information capable of being transmitted is limited to only the standard one; e.g., Recording Paper Size, A4; Coding Method, MH; and Line Density, Standard/Fine. Furthermore, the result of delivering the image information cannot be instantly obtained.

Regarding the real-time type Internet facsimile communication, since the Internet is utilized as the communication circuit, the communication cost can be lowered at the time of long-distance communication, and in addition, since the Internet facsimile device is directly connected to the terminal of the communication terminal, the image information communication can be practiced utilizing all of the terminal functions of the communication partner's terminal, and in addition, the result of delivering the image information can be instantly obtained. Those are the merits of the real-time type Internet facsimile communication. On the other hand, the communication has a demerit that the communication cannot be practiced when the partner's terminal is busy.

Furthermore, in each of the Group-3 facsimile communication, the electronic-mail type Internet facsimile communication, and the real-time type Internet facsimile communication, the image information mode in which information is capable of being transmitting may be limited for each mode. Therefore, it may be preferable to not fall-back to the electronic-mail type Internet facsimile communication from the other communication modes, for example, when the size of the used recording paper is B4, since that type of communication mode can usually not handle other than standard mode communications as mentioned above.

In this case, for example, "03-1234-567801" is registered in the "Telephone Number", "user1@abc.co.jp13" is registered in the "mail address", and "133.139.22.33**02" is registered in the "IP Address" as corresponding to a one-touch dial key "A".

As to the contents of the registration information, the priority order of the address information is: "Telephone Number", "IP Address", and "Mail Address", and the address information is set in this order. The "1" in the "b" slot of priority for the electronic-mail type Internet facsimile communication indicates that this mode is inhibited. According to this example, when one touch dial key "A" is entered, a first attempt at delivery will be made using the PSTN. If that fails, a fall back attempt will be made using the Internet via the IP address.

Figure 5:
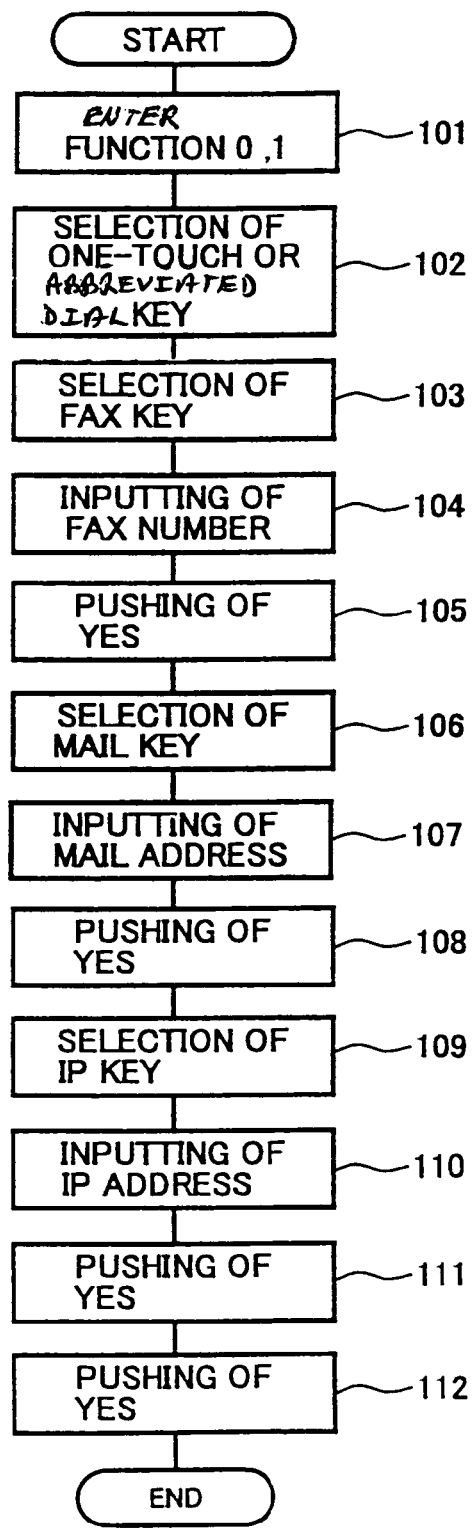
FIG. 5 is a flowchart illustrating an example of the user operation at the time of registering the address information address by the one-touch dial or the shortening dial into the network facsimile device IF.

In such construction as mentioned heretofore, when the address information to be communicated is registered in the one-touch dial or the shortening dial in the network facsimile device IF, the user performs the operation as illustrated in FIG. 5 by use of the operation display section 7.

At first, since the address registration mode is "01", the user operates, in order, the function key 7i, and the ten-key 7d ("0", "1") to designate the function code 01 (Step 101) in order to enter the address registration mode.

Next, operating the key group 7e or an abbreviated dial number, the user selects the appropriate one-touch dial key (step 102). The network facsimile device IF then displays suitable guidance on the liquid crystal display unit 7j, and requests the user to select either one of FAX number, mail address, and IP address.

When the user operates the FAX key 7f and thereby selects the FAX number (step 103), the network facsimile device IF displays suitable guidance on the liquid crystal display unit 7j and requires the user to input the FAX number and the priority. The user then inputs the FAX number and the priority by use of the ten-key pad 7d (Step 104). After finishing the inputting operation, the user operates the YES key 7k (Step 105).

The network facsimile device IF displays suitable guidance on the liquid crystal display unit 7j, and further displays thereon the inputted FAX number and priority. At the same time, the network facsimile device IF again requests the user to select either one of the FAX number, the mail address, and the IP address.

Next, when the user operates the electronic-mail key 7g and thereby selects the mail address (Step 106), the network facsimile device IF displays suitable guidance on the liquid crystal display unit 7j and requires the user to input the mail address and the priority. The user then inputs the mail address by use of the key group 7e and further inputs the priority by use of the ten-key pad 7d (Step 107). After finishing the inputting operation, the user operates the YES key 7k (Step 108).

The network facsimile device IF displays suitable guidance on the liquid crystal display unit 7j, and further displays the inputted FAX number and the priority, and the mail address and the priority. At the same time, the network facsimile device IF requests the user to again input either one of the FAX number, the mail address, and the IP address.

When the user then operates the IP address key 7h and thereby selects the IP address (Step 109), the network facsimile device IF displays suitable guidance on the liquid crystal display unit 7j and requires the user to input the IP address and the priority. The user then inputs the IP address by use of the ten-key pad 7d and the ".(period)" key of the key group 7e, and further inputs the priority by use of the ten-key 7d (Step 110). After finishing the inputting operation, the user operates the YES key 7k (Step 111).

Thereby, the network facsimile device IF displays suitable guidance on the liquid crystal display unit 7j and further displays the inputted FAX number and priority, the inputted mail address and priority, and the inputted IP address and priority. At the same time, the network facsimile device again requests the user to input either one of the FAX number, the mail address, and the IP address.

When the user finishes the operation of inputting the necessary address information (FAX number-Telephone number, mail address, and IP address), the user again pushes the YES key 7k and finishes the work of registering the information of the address to be communicated in the one-touch dial or the abbreviated dial (Step 112). Thereby, the network facsimile device IF registers the respective registered address information in the one-touch dial information corresponding to the designated one-touch dial-key or the abbreviated dial information corresponding to the designated abbreviated dial key. The operation is finished at this time.

Figure 6:
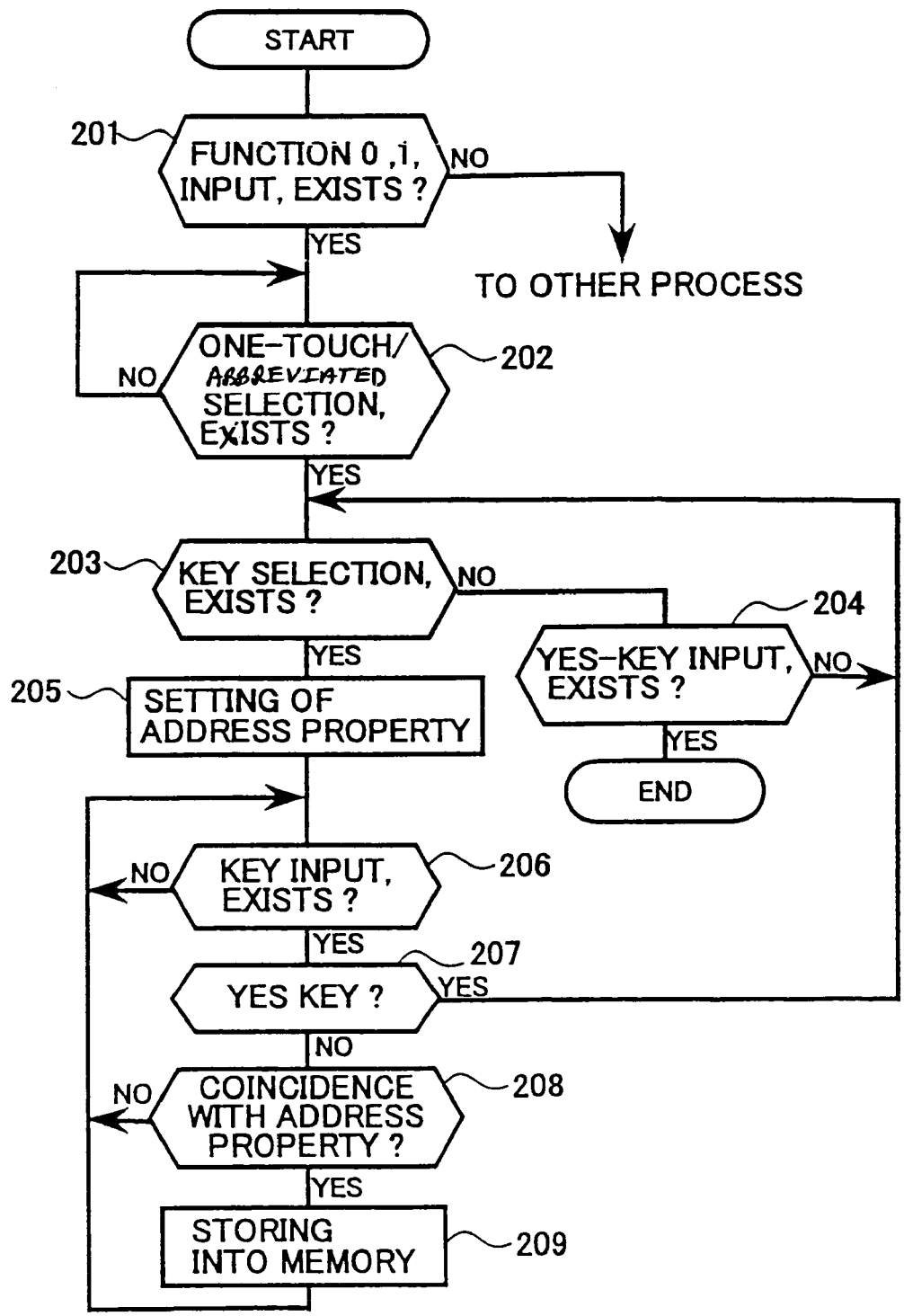
FIG. 6 is flowchart illustrating an example of the processing executed by the system control section at the time of registering the address information addressed by the one-touch dial or the shortening dial into the network facsimile device IF.

FIG. 6 illustrates an example of the process executed by the system control section 1 at the time of registering the information of the address to be communicated in the one-touch dial or the abbreviated dial.

At first, whether the function 01 is inputted is searched or confirmed (Step 201). When the result of Step 201 is "YES", the user operate the key group 7e or the shortening dial, and the process waits until the one-touch dial key or abbreviated dial key indicating the location the information is to be registered is selected (NO Loop of Step 202).

When the one-touch dial key or abbreviated dial key is selected and the result of Step 202 becomes "YES", the system control section 1 displays suitable operation guidance on the liquid crystal display unit 7j, requiring the user to input either one of the FAX number, the mail address, and the IP address. The user selects either one of the FAX key 7f, the electronic-mail key 7g, and the IP address key 7h, or the process waits until the YES key 7k is inputted (NO Loop of Steps 203 and 204).

When one of the FAX key 7f, the electronic-mail key 7g, and the IP address key 7h is selected, the result of Step 203 becomes "YES", the user then inputs the address property corresponding to the key selected at that time (Step 205), and the process waits until one of the keys is operated (NO Loop of Step 206).

When one of the keys is operated and thereby the result of the Step 206 becomes "YES", the user confirms whether the operated key is the YES key 7k (Step 207). When one of the address information keys is inputted and the result of the Step 207 becomes "NO", it is confirmed whether the key input coincides with the address property (Step 208). When the result of Step 208 becomes "YES", the address data inputted up to this point is stored into memory (Step 209) and the process returns to Step 206. The user prepares the next key inputting. When the result of Step 208 becomes "NO", the user ignores the key input at that time and returns to Step 206. The user prepares the next key inputting.

When the user pushes the YES key 7k after finishing the operation of inputting the address information for one address and the result of Step 207 becomes "YES", the process returns to Step 203 and the process waits for the next key operation by the user.

When the user operates the YES key 7k in order to finish the registration of the address information and the result of Step 204 becomes "YES", the process registers the respective address information registered at this time into the one-touch dial information corresponding to the designated one-touch dial key or into the abbreviated dial information corresponding to the designated abbreviated dial key. At this time, the operation is finished.

Figure 7:
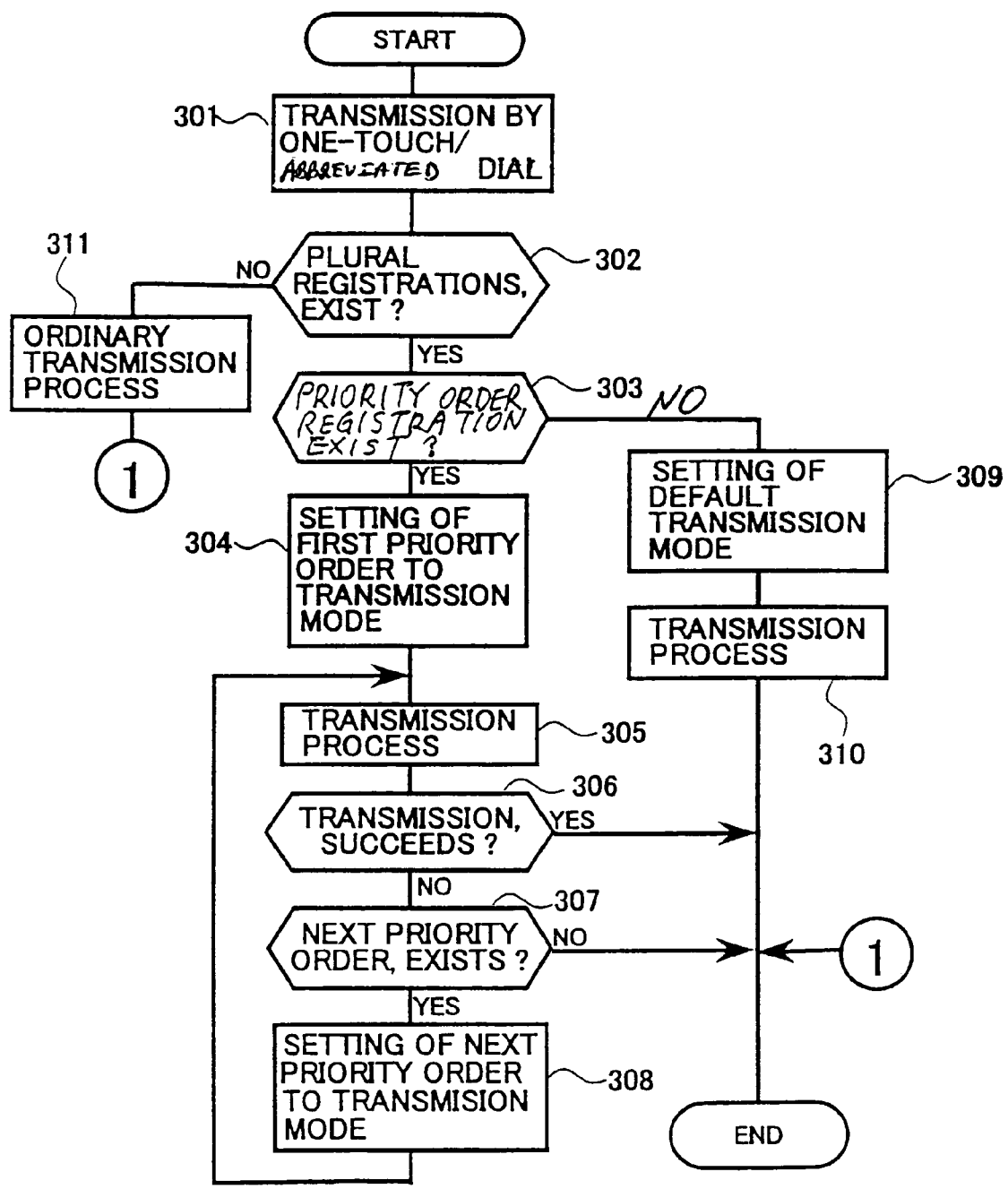
FIG. 7 is a flowchart illustrating an example of the processing performed at the time of transmitting the image information according to the present invention.

FIG. 7 illustrates an example of the processing at the time of transmitting the image information according to an embodiment of the present invention.

When the operation of transmitting to the designated address to be communicated by use of the one-touch dial or abbreviated dial is ordered (Step 301), the one-touch dial information or the abbreviated dial information corresponding to the one-touch dial key or abbreviated dial key operated at that time is read out. The system confirms whether plural address information are registered thereto (Step 302).

When plural address information are registered in the one-touch dial information or abbreviated dial information corresponding to the one-touch dial key or abbreviated dial key operated at that time and the result of Step 302 becomes "YES", the system confirms whether priority information is contained in the registered address information (Step 303).

When the result of Step 303 becomes "YES", the system selects as the first-priority, address information which is set with the highest priority and sets the transmission mode corresponding to the selected address information as the transmission mode used at that time (Step 304). The system further executes the transmission process (including any retransmission process if necessary) in the transmission mode and transmits the designated image information (Step 305).

The system then confirms whether the transmission of the image information has succeeded (Step 306). When the system succeeds in the transmission and the result of Step 306 becomes "YES", the operation ends.

Furthermore, when the transmission of the image information fails and the result of Step 306 becomes "NO", it is confirmed whether address information of the next highest priority is registered (Step 307). For example, when only address information of an inhibited fall-back is registered, the result of Step 307 becomes "NO".

When the address information of the next highest priority is registered and the result of Step 307 becomes "YES", the system selects the address information of the next priority, sets the transmission mode corresponding to the selected address information as the transmission mode to be used at that time (Step 308), returns to the process 305, and executes the transmitting process using that transmission mode.

On the other hand, when the result of Step 307 becomes "NO", the operation ends.

Furthermore, when priority information is not contained in the address information registered in the one-touch dial information or abbreviated dial information corresponding to the one-touch dial key or abbreviated dial key operated at that time and the result of Step 303 is NO, the system sets a previously set default transmission mode as the transmission mode to be used at that time (Step 309), and then executes the transmitting process in the transmission mode (Step 310) and transmits the designated image information. The previously set transmission mode can be any one of the three transmission modes discussed herein, for example, and can be preset by the user and/or during manufacture.

Furthermore, when plural address information are not contained in the one-touch dial information or abbreviated dial information corresponding to the one-touch dial key or abbreviated dial key operated at that time and the result of Step 302 becomes "NO", the system executes the transmitting process (including a retransmitting process if necessary) with the transmission mode corresponding to the registered address information, and transmits the designated image information (Step 311).

In such way, according to the present embodiment of the invention, since the address information among the plural address information registered in the one-touch dial or abbreviated dial are selected in the order of the highest priority, and then the operation of transmitting the image information of the transmission mode corresponding thereto is performed, it is possible to execute the operation of transmitting the image information intended by the user.

Furthermore, since plural address information are registered in the one-touch dial or abbreviated dial, the number of the keys to be prepared on the operation display section can be reduced, and the increase of the device cost can be suppressed.

Hereupon, in the above-mentioned embodiment, the fall-back of the transmission mode is automatically executed at the time of transmitting the image information in accordance with the priority of the registered address information. However, the user can also definitely select the transmission mode.

For instance, when the user pushes the one-touch key "A" once, for example, the telephone number in which the priority 1 is set is selected, and at the same time the FAX mode (Group-3 facsimile communication mode) is selected as the transmission mode, and the contents of the selection are displayed on the liquid crystal display unit 7j as shown in FIG. 8A.

Following the above process, when the user pushes the one-touch key "A" once again, the IP address in which the priority 2 is set is selected, and at the same time the real-time Internet mode (real-time type Internet facsimile communication mode) is selected as the transmission mode, and the contents of the selection are displayed on the liquid crystal display unit 7j, as shown in FIG. 8B.

Furthermore, when the user pushes the one-touch key "A" once again, the mail address in which the priority 3 is set is selected, and at the same time the Internet mail mode (mail-type Internet facsimile communication mode) is selected as the transmission mode, and the contents of the selection are displayed on the liquid crystal display unit 7j as shown in FIG. 8C.

Furthermore, when the user pushes the one-touch key "A" once again, the state of the selection goes back to the state as shown in FIG. 8A, and at the same time the contents displayed on the liquid crystal display unit 7j are renewed accordingly.

When the displayed contents show the transmission mode desired by the user, the user pushes the start key 7a. At this time, the user can start the operation of transmitting the image information using the displayed transmission mode.

In such way, the user can definitely designate the transmission mode. At this time, since it is sufficient for the user to repeatedly operate the same one-touch dial key, the operability (easiness of operation) of designating the address to be communicated can be largely improved. In addition, the user can designate the transmission mode desired by the user.

FIG. 9 illustrates, on this occasion, an example of the process executed by the system control section 1.

The system confirms whether the one-touch dial key is inputted (Step 401). When the result of Step 401 becomes "NO", the process advances to another process.

When the result of Step 401 becomes "YES", the number "1" is set to the value N of a counter (Step 402). The address information of the N-th priority is read out from the one-touch dial information corresponding to the operated one-touch dial key, and the transmission mode corresponding to the read-out address information is displayed on the liquid crystal display unit 7j (Step 403).

The process then waits until the one-touch dial key is operated (NO Loop of Steps 404 and 405).

When the user operates the one-touch dial key and the result of Step 405 becomes "YES", the system confirms whether it is the same key (Step 406). When the same key is operated once again and the result of Step 406 becomes "YES", the value obtained by adding "1" to the counter (value) N1 is processed by the modulo 3 and is set to the counter (value) N (Step 407). The process returns to Step 403 and displays the transmission mode of the next priority.

When another one-touch key is operated and the result of Step 406 becomes "NO", the number "1" is set to the counter value N (Process 408), and the process returns back to Step 403. On this occasion, the address information of the N(1)-th priority is read out from the one-touch dial information corresponding to the newly operated one-touch dial key, and the transmission mode corresponding to the read-out address information is displayed on the liquid crystal display unit 7j.

Furthermore, when the YES key 7k is operated and the result of Step 404 becomes "YES", the address information and the transmission mode are applied (to the process), and the transmitting process of transmitting the designated image information is executed (Step 409). At this time the operation ends.

In the embodiment mentioned heretofore, when the one-touch dial key is repeatedly operated, the registered address information is selected in order in accordance with the priority thereof. However, even when the shortening dial key is repeatedly operated, the same process can be executed.

As is apparent from the foregoing description, the present invention can take (demonstrate) the advantageous superior functional effects as mentioned hereinafter.

To state in more detail, according to the present invention, since the address information is selected in the order of priority among the plural address information registered in the one-touch dial or the shortening dial, and the operation of transmitting the image information using the transmission mode corresponding thereto can be performed, it is possible to execute the operation of transmitting the image information intended by the user. This is one of the functional effects of the present invention.

Furthermore, since the plural address information are registered in the one-touch dial or shortening dial, the number of keys prepared on the operation display section can be reduced. In addition, the increase of the device cost can be suppressed.

Furthermore, the user can definitely designate the transmission mode. It is sufficient only to repeatedly press the same one-touch dial key at the time of designating the transmission mode. Therefore, the operability (easiness of the operation) of designating the address to be communicated can be largely improved. In addition, it is possible to designate the transmission mode intended by the user. Those matters as mentioned heretofore are the advantageous functional effects of the present invention.

The embodiment of the present invention has been described heretofore. However, other numerous embodiments or numerous modification variations of the invention are possible in light of the above teachings. It is therefore to be understood that, within the scope of the appended claims, the invention may be practiced otherwise than as specifically described herein.

Having now fully described the invention, it will be apparent to one of ordinary skill in the art that many changes and modifications can be made thereto without departing from the spirit and scope of the inventions as set forth therein. This application is based on Japanese Patent Application No. JPAP10-352,679, filed on Dec. 11, 1998, and entire contents of which are herein incorporated by reference.

What is claimed is:

1. A network facsimile device for communicating in at least one of a plurality of communication modes for transmitting designated image information to a designated destination, said device comprising:

scanner means for scanning a document and outputting document image information;

input means for operator input of information identifying a plurality of destination addresses, including for each destination a plurality of address information respectively corresponding to said plurality of communication modes, and for designating one address among said plurality of addresses to which the document image information is to be transmitted; and address information registering means for registering the plurality of address information respectively corresponding to said plurality of communication modes, input by the operator through said input means, for each destination, wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, wherein one or more of the plurality of address information registered by said address information registering means is assigned a designation, said designation indicating whether the communication mode corresponding to the designated address information is to be inhibited.

2. The network facsimile device as defined in claim 1, further comprising display means,
wherein, when said input means is repeatedly operated at the time of designating the address, a plurality of address information registered are changed over and viewed on said display means in order.

3. The network facsimile device as defined in claim 2, wherein said input means comprises one-touch dial means for enabling a large number of addresses to be registered and to designating the one address by operating the one-touch dial means.

4. The network facsimile device as defined in claim 1, wherein each of the plurality of address information registered by said address information registering means can be set with a transmission priority order indicating an order in which communication modes are to be used for transmitting the designated image information to the designated destination.

5. The network facsimile device as defined in claim 4, wherein, when same key is repeatedly operated at the time of selecting the address, plural address information registered on said key are changed over and selected in accordance with said transmission priority order.

6. The network facsimile device as defined in claim 5, wherein said input means comprises one-touch dial means for enabling a large number of addresses to be registered and for designating the one address by operating the one-touch dial means.

7. The network facsimile device as defined in claim 4, wherein said input means comprises one-touch dial means for enabling a large number of addresses to be registered and for designating the one address by operating the one-touch dial means.

8. The network facsimile device as defined in claim 1, wherein said input means comprises one-touch dial means for enabling a large number of addresses to be registered and for designating the one address by operating the one touch dial means.

9. The network facsimile device of claim 1, wherein the operator uses said input means to designate one of the addresses registered for a destination to which the document image information is to be transmitted, and the document image information is transmitted to the designated address.

10. The network facsimile device of claim 1, wherein said information input through said input means identifying said plurality of destination addresses and corresponding communication modes includes for each address information, a corresponding priority value indicative of user preferences, and wherein an order in which the communication modes are to be used for transmitting the designated image information to the designated destination is determined according to the priority values corresponding to the respective communication modes.

11. A network facsimile device for communicating in at least one of a plurality of communication modes for transmitting designated image information to a designated destination, said device comprising:
scanner means for scanning a document and outputting document image information;
Internet image information communicating means for performing communication of the image information through the Internet; and
public network image information communicating means for performing communication of the image information through a public network, wherein said Internet image information communicating means and said public network image information communicating means communicate information to a plurality of designated destinations;
input means for inputting information identifying a plurality of destination addresses, including for each destination a plurality of address information respectively corresponding to said plurality of communication modes, and for designating one address among said plurality of addresses to which the document image information is to be transmitted; and
address information registering means for registering a plurality of address information respectively corresponding to said Internet image information communicating means and public network image information communicating means, for each designated destination,
wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode,
wherein one or more of the plurality of address information registered by said address information registering means is assigned a designation, said designation indicating whether the communication mode corresponding to the designated address information is to be inhibited.

12. The network facsimile device as defined in claim 11, further comprising display means, wherein, when said input means is repeatedly operated at the time of designating the address, said plurality of registered addresses are displayed, in order.

13. The network facsimile device as defined in claim 11, wherein each of the plurality of address information registered by said address information registering means can be set with a transmission priority order indicating an order in which communication modes are to be used for transmitting the designated image information to the designated destination.

14. The network facsimile device as defined in claim 11, wherein same key is repeatedly operated at the time of selecting the address, said dialing means changes over and selects, in order, said plural addresses information registered in said key.

15. A network facsimile device for communicating in at least one of a plurality of communication modes for transmitting designated image information to a designated destination, said device comprising:
scanner means for scanning a document and outputting document image information;
electronic-mail type Internet image information communicating means for performing communication of the image information through the Internet by use of electronic mail;
real-time type Internet image information communicating means for performing communication of the image information through said Internet in real time; and
public network image information communicating means for performing communication of the image information through a public network,
wherein any one of said electronic-mail type Internet image information communicating means, said real-time type Internet image information communicating means, and said public network image information communicating means communicates information to a plurality of designated destinations; and input means for inputting information identifying a plurality of destination addresses, including for each destination a plurality of address information respectively corresponding to said plurality of communication modes, and for designating one address among said plurality of addresses to which the document image information is to be transmitted; and address information registering means for registering a plurality of address information respectively corresponding to said electronic-mail type Internet image information communicating means, said real-time type Internet image information communicating means, and said public network image information communicating means, for each designated destination, wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, wherein one or more of the plurality of address information registered by said address information registering means is assigned a designation, said designation indicating whether the communication mode corresponding to the designated address information is to be inhibited.

16. The network facsimile device as defined in claim 15, wherein said plurality of registered address information include an e-mail address for use by said electronic-mail type Internet image information communicating means, an IP address for use by said real-time type Internet image information communicating means, and a telephone number for use by said public network image information communicating means.

17. The network facsimile device as defined in claim 16, further comprising display means, wherein, when said input means is repeatedly operated at the time of designating the address, said plurality of registered addresses are displayed in order.

18. The network facsimile device as defined in claim 16, wherein each of the plurality of address information registered by said address information registering means can set the transmission priority order in which communication modes are to be used for transmitting the designated image information to the designated destination.

19. The network facsimile device as defined in claim 16, wherein, same key is repeatedly operated at the time of selecting the address, said dialing means changes over and selects, in order, said plural addresses information registered in said key.

20. The network facsimile device as defined in claim 15, further comprising display means, wherein, when said input means is repeatedly operated at the time of designating the address, said plurality of registered addresses are displayed in order.

21. The network facsimile device as defined in claim 15, wherein each of the plurality of address information registered by said address information registering means can set the transmission priority order indicating an order in which communication modes are to be used for transmitting the designated image information to the designated destination.

22. The network facsimile device as defined in claim 15, wherein same key is repeatedly operated at the time of selecting the address, said dialing means changes over and selects, in order, said plural addresses information registered in said key.

23. The network facsimile device as defined in any one of claims 11 through 19,
wherein said input means comprises one-touch dialing means enabling a large number of addresses to be registered and allowing a particular address to be designated by performing an operation using one key.

24. A network facsimile device for communicating in at least one of a plurality of communication modes for transmitting designated image information to a designated destination, said device comprising:

scanner means for scanning a document and outputting document image information;

electronic-mail type Internet image information communicating means for performing communication of the image information through the Internet by use of electronic mail;

real-time type Internet image information communicating means for performing communication of the image information through said Internet in real time; and public network image information communicating means for performing communication of the image information through the public network, wherein any one of said electronic-mail type Internet image information communicating means, said real-time type Internet image information communicating means, and said public network image information communication means communicates information to a plurality of designated destinations;

input means for inputting information identifying a plurality of destination addresses, including for each destination a plurality of address information respectively corresponding to said plurality of communication modes, and for designating one address among said plurality of addresses to which the document image information is to be transmitted, wherein a mail address for use by said electronic-mail type Internet image information communicating means, an IP address for use by said real-time type Internet image information communicating means, and a telephone number for use by said public network image information communicating means are respectively registered, for each designated destination, wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, and wherein, when said input means is repeatedly operated at the time of designating the address, a plurality of address information are changed over and presented in order, wherein one or more of the plurality of address information is assigned a designation, said designation indicating whether the communication mode corresponding to the designated address information is to be inhibited.

25. A network facsimile device for communicating in at least one of a plurality of communication modes for transmitting designated image information to a designated destination, said device comprising:

scanner means for scanning a document and outputting document image information;

electronic-mail type Internet image information communicating means for performing communication of the image information through an Internet by use of an electronic mail;

real-time type Internet image information communicating means for performing communication of the image information through said Internet in real time;

public network image information communicating means for performing communication of the image information through a public network, wherein any one of said electronic-mail type Internet image information communicating means, said real-time type Internet image information communicating means, and said public network image information communicating means communicates information to a plurality of designated destinations;

input means for inputting information identifying a plurality of destination addresses, including for each destination a plurality of address information respectively corresponding to said plurality of communication modes, and for designating one address among said plurality of addresses to which the document image information is to be transmitted;

wherein a mail address for use by said electronic-mail type Internet image information communicating means, an IP address for use by said real-time type Internet image information communicating means, and a telephone number for use by said public network image information communicating means are respectively registered, for each designated destination, wherein respective transmission priority orders are registered for each of said mail address, said IP address, and said telephone number, wherein any one of said electronic-mail type Internet image information communicating means, said real-time type Internet image information communication means, and said public network image information communicating means is selected in accordance with the transmission priority order respectively registered with said mail address, said IP address, and said telephone number, for image information transmission to the address selected by operation of said input means, and wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication modes wherein one or more of the plurality of address information is assigned a designation, said designation indicating whether the communication mode corresponding to the designated address information is to be inhibited.

26. A network facsimile device for communicating in at least one of a plurality of communication modes for transmitting designated image information to a designated destination, said device comprising:

scanner means for scanning a document and outputting document image information;

electronic-mail type Internet image information communicating means for performing communication of the image information through the Internet by use of an electronic mail;

real-time type Internet image information communicating means for performing communication of the image information through said Internet in real time; and public network image information communicating means for performing communication of the image information through a public network, wherein any one of said electronic-mail type Internet image information communicating means, said real-time type Internet image information communicating means, and said public network image information communicating means communicates information to a plurality of designated destinations;

input means for inputting information identifying a plurality of destination addresses, including for each destination a plurality of address information respectively corresponding to said plurality of communication modes, and for designating one address among said plurality of addresses to which the document image information is to be transmitted;

wherein a mail address for use by said electronic-mail type Internet image information communicating means, an IP address for use by to said real-time type Internet image information communicating means, and a telephone number for use by said public network image information communicating means are respectively registered, for each designated destination, wherein respective transmission priority orders are registered for each of said mail address, said IP address, and said telephone number, wherein, when said input means is repeatedly operated at the time of selecting the address, a plurality of address information are changed over and presented in order in accordance with the transmission priority order respectively registered for each said mail address, said IP address, and said telephone number, and wherein an operator uses said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, wherein one or more of the plurality of address information is assigned a designation, said designation indicating whether the communication mode corresponding to the designated address information is to be inhibited.

27. The network facsimile device as defined in claim 17, 13, 24, 25 or 26, wherein said input means comprises one-touch dialing means enabling a large number of addresses to be registered.

28. A method for controlling a network facsimile device for communicating in at least one of a plurality of communication modes for transmitting designated image information to a designated destination, said method comprising the steps of:

providing, in said network facsimile device, (i) electronic-mail type Internet image information communicating means for performing communication of image information through an Internet by use of an electronic mail, (ii) real-time type Internet image information communicating means for performing communication of image information through said Internet in real time, (iii) public network image information communicating means for performing communication of image information through a public network, (iv) scanner means for scanning a document and providing document image information based on the scanned document, and (v) input means for an operator to select any one of said electronic-mail type Internet image information communicating means, said real-time type Internet image information communicating means, and said public network image information communication means to transmit the document image information to a designated address, for the operator to input information identifying a plurality of destination addresses, including for each destination a plurality of address information respectively corresponding to said plurality of communication modes, and for the operator to designate one address among said plurality of addresses to which the document image information is to be transmitted;

respectively registering a mail address for use by said electronic-mail type Internet image information communicating means, an IP address for use by said real-time type Internet image information communicating means, and a telephone number for use by said public network image information communicating means; and allowing an operator to use said input means to (i) designate one of the plurality of destinations, (ii) select any one of said plurality of communication modes available for communicating through said network facsimile device with the designated destination, and (iii) then request that the image information, obtained from scanning of said document by said scanning means, be transmitted to the corresponding address of the designated destination through the selected communication mode, wherein one or more of the plurality of address information registered by said address information registering means is assigned a designation, said designation indicating whether the communication mode corresponding to the designated address information is to be inhibited.

29. The network facsimile method as defined in claim 28, wherein said dialing means is one-touch dialing means enabling to register a large number of addresses.

30. The method of claim 28, further comprising:

receiving operator designation, through said dialing means, of one of the mail address, the IP address and the telephone number registered for a destination associated with said key; and transmitting the document image information to the address designated by the operator.

31. A method for controlling a network facsimile device for communicating in at least one of a plurality of communication modes for transmitting designated image information to a designated destination, said method comprising the steps of:

providing, in said network facsimile device, (i) electronic-mail type Internet image information communicating means for performing communication of image information through an Internet by use of an electronic mail, (ii) real-time type Internet image information communicating means for performing communication of image information through said Internet in real time, (iii) public network image information communicating means for performing communication of image information through a public network, (iv) scanner means for scanning a document and providing document image information based on the scanned document, and (v) input means for an operator to select any one of said electronic-mail type Internet image information communicating means, said real-time type Internet image information communicating means, and said public network image information communication means to transmit designated image information to said designated address, for the operator to input information identifying a plurality of destination addresses, including for each destination a plurality of address information respectively corresponding to said plurality of communication modes, and for the operator to designate one address among said plurality of addresses to which the document image information is to be transmitted;

respectively registering a mail address corresponding to said electronic-mail type Internet image information communicating means, an IP address corresponding to said real-time type Internet image information communicating means, and a telephone number corresponding to said public network image information communicating means, for one address input through said dialing means;

registering respective transmission priority orders in said mail address, said IP address, and said telephone number; and registering any one of said electronic-mail type Internet image information communicating means, said real-time type Internet image information communication means, and said public network image information communicating means in accordance with the transmission priority order respectively registered in said mail address, said IP address, and said telephone number, for the image information transmission to the address selected by the key operation of said dialing means, allowing an operator to use said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, wherein one or more of the plurality of address information is assigned a designation, said designation indicating whether the communication mode corresponding to the designated address information is to be inhibited.

32. The network facsimile method as defined in claim 31, wherein said dialing means is one-touch dialing means enabling to register a large number of addresses.

33. A method of controlling a network facsimile device for communicating in at least one of a plurality of communication modes for transmitting designated image information to a designated destination, said method comprising the steps of:

providing, in said network facsimile device, (i) electronic-mail type Internet image information communicating means for performing communication of image information through an Internet by use of an electronic mail, (ii) real-time type Internet image information communicating means for performing communication of image information through said Internet in real time, (iii) public network image information communicating means for performing communication of image information through a public network, (iv) scanner means for scanning a document and providing document image information based on the scanned document, and (v) input means for an operator to select any one of said electronic-mail type Internet image information communicating means, said real-time type Internet image information communicating means, and said public network image information communication means to transmit designated image information to said designated address, and for enabling the operations of registering a large number of addresses and designating one address among said addresses by operating keys;

respectively registering a mail address corresponding to said electronic-mail type Internet image information communicating means, an IP address corresponding to said real-time type Internet image information communicating means, and a telephone number corresponding to said public network image information communicating means for one address of said dialing means;

changing over and selecting, in order, said plural addresses information registered in said key by use of said dialing means, when said same key is repeatedly operated at the time of selecting the address;

registering respective transmission priority orders in said mail address, said IP address, and said telephone number; and changing over and selecting said plural addresses information by use of said dialing means, in accordance with the transmission priority order respectively registered in said mail address, said IP address, and said telephone number, when the same key is repeatedly operated at the time of selecting the address, allowing an operator to use said input means to (i) designate one of the plurality of destinations, (ii) select any one of said plurality of communication modes available for communicating through said network facsimile device with the designated destination, and (iii) then request that the image information be transmitted to the corresponding address of the designated destination through the selected communication mode, wherein one or more of the plurality of address information is assigned a designation, said designation indicating whether the communication mode corresponding to the designated address information is to be inhibited.

34. The network facsimile method as defined in claim 33, wherein said dialing means is one-touch dialing means enabling to register a large number of addresses.

* * * * *